United States Patent [19]

Smyth et al.

[11] Patent Number: 5,331,452
[45] Date of Patent: Jul. 19, 1994

[54] OPTICAL DETECTOR

[75] Inventors: Peter P. Smyth; Brian R. White, both of Woodbridge, England

[73] Assignee: British Telecommunications public limited company, London, England

[21] Appl. No.: 848,983

[22] PCT Filed: Sep. 13, 1990

[86] PCT No.: PCT/GB90/01416
 § 371 Date: Apr. 20, 1992
 § 102(e) Date: Apr. 20, 1992

[87] PCT Pub. No.: WO91/04617
 PCT Pub. Date: Apr. 4, 1991

[30] Foreign Application Priority Data

Sep. 13, 1989 [GB] United Kingdom ............. 8920733.6

[51] Int. Cl.⁵ ............................................. H04B 10/06
[52] U.S. Cl. .................................. 359/189; 359/193; 359/195; 307/311; 250/227.14
[58] Field of Search ............. 359/189, 190, 191, 192, 359/193, 194, 195, 187, 173; 250/227.14; 307/311

[56] References Cited

U.S. PATENT DOCUMENTS

| | | | |
|---|---|---|---|
| 3,838,278 | 9/1974 | Duguay et al. | 359/140 |
| 4,634,858 | 1/1987 | Gerdt et al. | 250/227.14 |
| 4,718,121 | 1/1988 | Epworth | 359/188 |
| 4,736,462 | 4/1988 | Joel, Jr. | 359/189 |
| 4,959,540 | 9/1990 | Fan et al. | 250/227.12 |
| 5,023,946 | 6/1991 | Yamazaki et al. | 359/189 |

FOREIGN PATENT DOCUMENTS

| | | |
|---|---|---|
| 3706463 | 10/1988 | Fed. Rep. of Germany . |
| 2566978 | 1/1986 | France . |
| 2135551 | 8/1984 | United Kingdom ........... H04B 9/00 |

OTHER PUBLICATIONS

Patent Abstracts of Japan, vol. 11, No. 51 (E-480) (2498) 17 Feb. 1987 & JP, A, 61212126 (Fujitsu Ltd) 20 Sep. 1986.
IBM Technical Disclosure Bulletin, vol. 30, No. 6, Nov. 1987 (Armonk, N.Y., US) "Optimum biasing of photodiodes as used in infrared communications," pp. 213–214.
Journal of Optical Communications, vol. 9, No. 4, Dec. 1988 (Berlin, DE) N. Singh et al: "Design considerations in dual-detector receiver", pp. 150–151.
Druchevskii et al, Extention of Dynamic Range of a Photoreceiver *Based On a Photodiode*, Instruments and Experimental Techniques, vol. 23, No. 3, Part 2, May–Jun. 1980, pp. 758–760.

Primary Examiner—Richard E. Chilcot, Jr.
Assistant Examiner—Rafael Bacares
Attorney, Agent, or Firm—Nixon & Vanderhye

[57] ABSTRACT

An optical detector for use in detecting digital optical signals has an optical fiber coupler which splits a received optical signal into two signal portions. The coupler has unequal length output fibers so that one signal portion impinges upon an associated photodetector delayed relative to the other. The photodetectors are connected in series nonopposed when the delay is equal to the bit period of the optical signal the output of the detector is the differential code (dicode) of the received signal which can be recovered by a high input impedance, i.e. integrating, amplifier. By forming the dicode in the optical domain in this manner large DC and AC dynamic ranges are obtained without linearity constraints on the optical transmission source that apply when the optical signal is transmitted as a dicode.

16 Claims, 3 Drawing Sheets

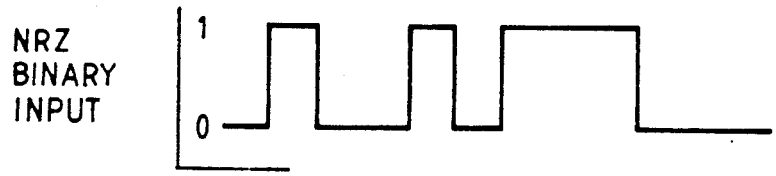
Fig. 2(a) NRZ BINARY INPUT
Fig. 2(b) NON-DELAYED INPUT
Fig. 2(c) DELAYED INPUT
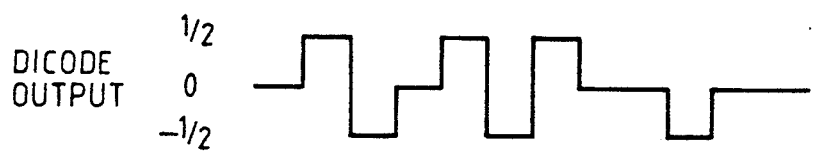
Fig. 2(d) DICODE OUTPUT
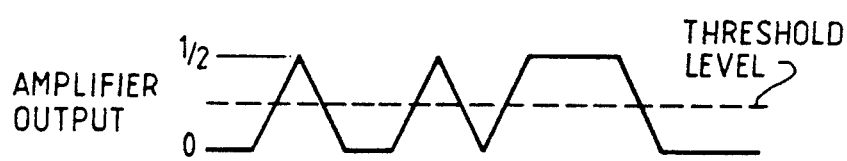
Fig. 3(a) AMPLIFIER OUTPUT
Fig. 3(b) RESTORED NRZ SIGNAL
time

OPTICAL DETECTOR

BACKGROUND OF THE INVENTION

1. Field of the Invention

This invention relates to optical detectors. Optical detectors are used in digital optical fiber communications to receive and then convert incident optical signals into corresponding electrical signals which are then amplified and processed by electronic means.

2. Related Art

High input impedance preamplifiers are commonly used in preference to low impedance or transimpedance configurations when the sensitivity of the receiver is of primary importance because of their lower thermal noise. In high impedance preamplifiers the value of the input bias resistance, used to bias the input transistor, is made arbitrarily high to reduce its thermal noise.

There are, however, three disadvantages associated with high impedance amplifiers. Firstly the high input resistance combined with the input capacitance of the transistor severely restricts the bandwidth available to process the incoming digital signal. The receiver acts as a leaky integrator and requires subsequent equalisation to restore bandwidth. Pulse shapes therefore become increasingly difficult to achieve as data rates increase when the equalisation reduces the output signal swing. This can lead to degradation of the signal-to-noise ratio on its output. Secondly the ramping effect caused by the integration of pulses introduces an AC dynamic range limitation when binary sequences are used which depends on the coding scheme used to construct the transmitted data sequence. The dynamic range is most severely restricted when long consecutive runs of one digital state are allowed. Thirdly, the mean photocurrent flows through an input bias resistor introducing a large voltage drop across the resistor which limits the DC dynamic range of the receiver. This is commonly alleviated by the introduction of a control loop which adjusts the voltage at the end of the resistor to compensate for the voltage dropped across it. However, the DC dynamic range is still limited by the power supply limitation of the control circuit. Reductions in the value of this resistor to increase the DC dynamic range decrease the sensitivity of the receiver.

One solution to the problem of extending the D.C. dynamic range of optical detectors has been proposed in an article by V. A. Druchevskii et al., "Extension of dynamic range of a photoreceiver based on a photodiode", in "INSTRUMENTS AND EXPERIMENTAL TECHNIQUES", vol. 23, no. 3, part 2, May–June 1980, pp. 758-760. The circuit described in this article increases the dynamic range of a photodiode detector by supplying the bias voltage to the photodiode from the output of an operational amplifier downstream of the photodiode, the bias voltage being varied once the output voltage of the operational amplifier exceeds a preset threshold level.

One known solution of the problem of AC dynamic range limitation is to employ a differential code (dicode) scheme to encode the optically transmitted information to prevent ramping in the amplifier output. A means of achieving optical dicoding is described in the United Kingdom patent specification GB2,135,551. It comprises encoding a two-level, input electrical signal at a transmitter representative of digital data as a three level optical signal such that a transition in the input signal from low to high is encoded as a first light intensity level, a transition from high to low as a second intensity level, and an absence of a transition as a third intensity level intermediate the first and second light intensity levels.

A method of obtaining the electrical dicode of binary data to be used to modulate an optical source at the transmitter is to introduce a bit time delay and subtract the delayed electrical waveform from the undelayed electrical waveform. Since the three-level code is a differentiating code it may be directly decoded by the integrating behaviour of the high input impedance receiver. The three level code however imposes a linearity constraint on both the optical source and its drive circuitry as the three-level coder has to produce pulses which are symmetrical about the mid-level which itself should remain independent of the input binary state.

BRIEF SUMMARY OF THE INVENTION

According to a first aspect of the present invention an optical detector comprises two photodetectors connected in series non-opposed, an optical splitter for splitting a received optical signal into two portions such that each signal portion impinges on an associated one of the photodetectors, and a delay means located between the optical splitter and the photodetectors which provides that one signal portion is delayed relative to the other at the photodetectors.

When such an optical detector is used to detect binary encoded optical signals having a data rate such that the difference in optical path lengths between the optical splitter and each photodetector corresponds to one bit period, the combined photocurrent at an output line connected to a point between the photodetectors is the dicode corresponding to the received binary digital data. This photocurrent can be connected to a high impedance preamplifier to perform the integration to decode the dicode. The detector therefore provides the advantages of improved AC dynamic range associated with the known method of transmitting an optical dicode signal but because the dicoding is achieved at the detector the problems of linearity constraints on the transmission optical source and its drive circuitry are obviated. Further, the use of non-opposed photodetectors to achieve the optical dicoding simultaneously provides a large DC dynamic range without recourse to feedback control to adjust the photodetector bias voltage.

Ideally the responsivity of the photodetectors will be accurately matched and each well optically coupled to a 50:50 splitter but a mismatch in either of the first two conditions aspect can be compensated by employing a non-50:50 coupler. A mismatch should however be avoided because of a consequent 1 reduction in DC dynamic range and the introduction of low frequency pulse distortion.

The optical splitter is preferably an optical fiber coupler as it is relatively cheap and convenient to manufacture and the delaying of one signal portion relative to the other readily achieved by simply making one of the output fibers of the splitter longer than the other. It will be appreciated other forms of splitters for example ½ mirrors or Y-splitters, and other means of achieving a difference in optical path length, for example placing one detector further from the splitter than the other, can be employed to obtain the advantages of the present invention which in no manner depends an the particular means used to achieve such optical splitting and relative delays of the signal portions.

The choice of photodetector will depend on the user's requirements. For example, an avalanche photodiode (APD) may be used in preference to a PIN diode if greater sensitivity is required but this introduces greater constraints on the stabilizing of the power supply to ensure the gains are accurately controlled and matched.

The use of two photodetectors results in a slight reduction in sensitivity compared to previously other known direct detectors but not as much as would be incurred in using a low input impedance amplifier or transimpedance amplifier to avoid AC dynamic range limitations.

According to a second aspect of the present invention a method of detecting an optical digital signal comprises optically splitting the optical signal into two signal portions, delaying one signal portion relative to the other after optically splitting the optical signal and causing each portion to impinge on an associated one of two photodetectors connected in series non-opposed.

BRIEF DESCRIPTION OF THE DRAWINGS

Embodiments of the invention and its method of operation will now be further described by way of examples only with reference to the accompanying drawings of which

FIGS. 2(a) to 2(d) illustrate a typical received non-return to zero (NRZ) optical binary signal, the two optical signal portions impinging on the photodetectors, and the corresponding dicode electrical output from the embodiment of FIG. 1, respectively;

FIGS. 3(a) and 3(b) illustrate the integration of the electrical dicode output of FIG. 2(b) and the electrical output from a threshold detector fed with the output of 3 (a), respectively;

DETAILED DESCRIPTION OF EXEMPLARY EMBODIMENTS

Figure 1:
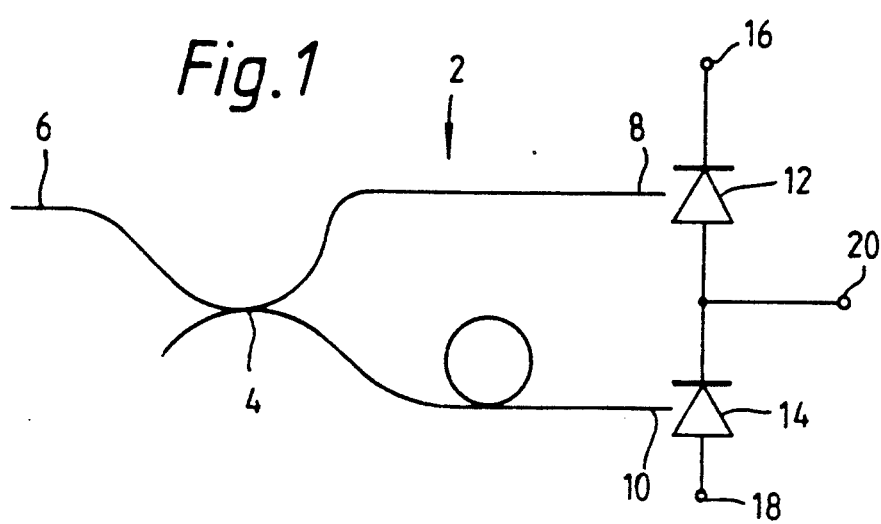
FIG. 1 is diagrammatic representation of an optical detector according to the present invention.

Referring to FIG. 1, an optical detector 2 includes a conventional 50:50 optical fiber coupler 4, manufactured for example by fusion tapering a pair of optical fibers together, having an input fiber portion 6 and first and second fiber output portions 8 and 10 respectively. The optical fiber portion 10 is longer than the portion 8. Two matched photodetectors 12 and 14 are connected in series, non-opposed, between electrical connections 16 and 18 across which a supply voltage (not shown) can be applied. An electrical output 20 is connected between the photodetectors 12 and 14.

The ends of fiber portions 8 and 10 are located equidistantly from, and optically coupled to, the photodetectors 12 and 14 respectively.

A digital optical signal may be coupled into the fiber portion 6 by any convenient technique, for example by splicing the portion 6 to a communications fiber on which the optical signal is propagated. The received optical signal is split into two equal intensity portions which propagate along the respective fiber portions 8 and 10 to impinge on the photodetectors 12 and 14. The photodetectors 12 and 14 provide an electrical signal at the output 20 proportional to the difference in intensities of the two optical signals at the photodetectors.

Consider now a digital optical signal having a bit rate such that the delay of the signal portion caused by the longer length of fiber portion 10 relative to the signal portion propagating along fiber portion 8 causes the photodetector 14 to receive a signal delayed by 1 bit relative to the signal portion received by the photodetector 12. Assuming, for the sake of example, the received optical signal is the digital signal as illustrated in FIG. 2(a), the signal portions detected by the photodetector 13 and 14 will be as shown in FIGS. 2(b) and 2(c) respectively. The electrical output current from the output 20 will then be as illustrated in FIG. 2(d), that is, the output will the dicode of the optical input signal 2(a).

Referring now to FIGS. 3(a) and 3(b) there is illustrated the recovery of the electrical equivalent to original data signal. In particular, FIG. 3(a) illustrates the output of an integrating, high input impedance amplifier (not shown) for input signal 2(d) with a mid-level of 0 volts. The uniform amplitude signal may be subsequently restored to a binary signal by means of a threshold detector (not shown).

Figure 4:
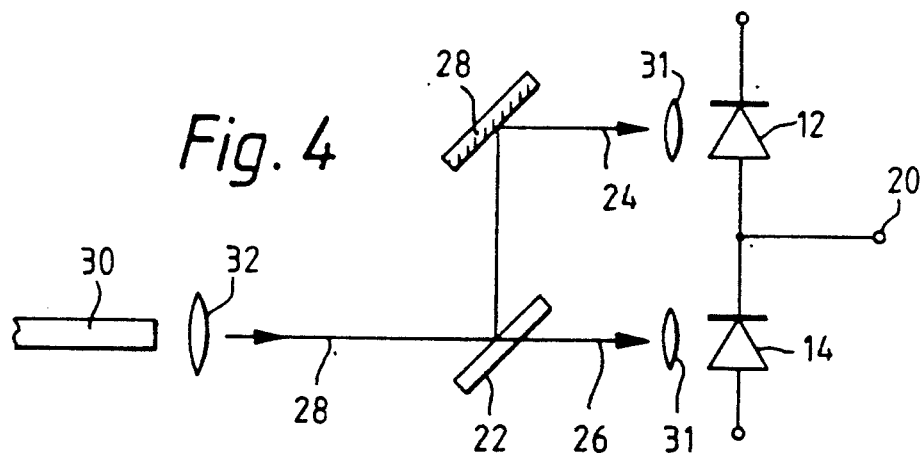
FIGS. 4 and 5 are diagrammatic representation of further embodiments of the present invention which use a half mirror as an optical splitter.
Figure 5:
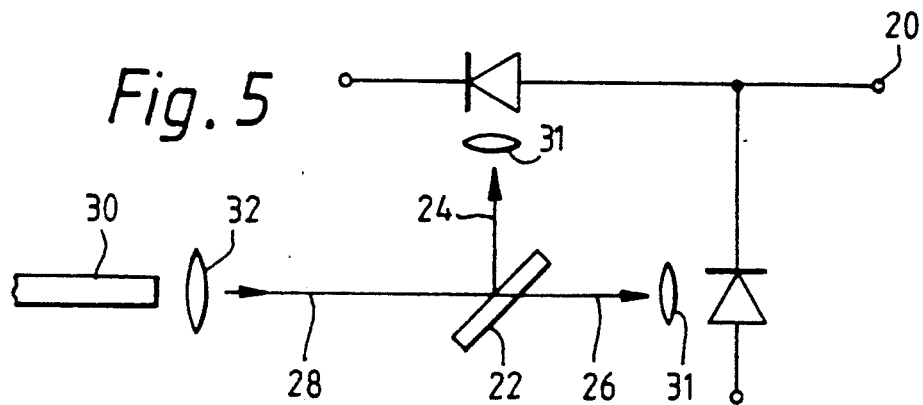

Referring now to FIGS. 4 and 5, there are shown further embodiments of the present invention each using a half-mirror 22 to derive two equal intensity signal portions 24 and 26 from an input optical signal 28, the portion 24 travelling further via the full mirror 28 to reach the corresponding photodetector 12 than the portion 26 and so its detection is delayed relative to it. The input optical signal is, in this embodiment, the output from a communications fiber 30 collimated by a lens Lenses 31 focus the two portions of light from the beam splitter 22 onto the photodetectors 12 and 14. The embodiment of FIG. 5 is the same as that of FIG. 4 except that the mirror 28 is dispensed with, the photodetector being located to intercept portion 24 directly from the half mirror 22 and further from it than photodetector 14 to obtain the required relative delay in detection of the signal portions 24 and 26.

It will be clear that any means for splitting the received optical signal into two portions and causing one to be delayed relative to the other may be employed in the present invention.

Figure 6:
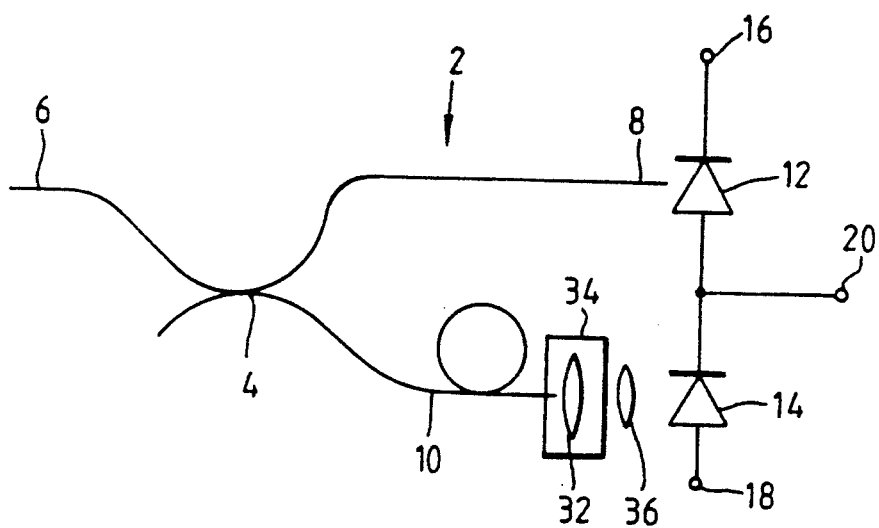
FIG. 6 is a diagrammatic representation of a tunable optical detector according to the present invention.

If the data rate of the optical signal to be detected is known and fixed, an optical detector according to the present invention may have the optical splitter and photodetectors fixed to provide the corresponding delay in signal portions. If the data rate is not known or variable, the photodetector may be made tunable to the data rate by providing means for altering the difference in optical path length between the optical splitter and each photodiode. An example of such a tunable optical detector according to the present invention is shown in FIG. 6. This is similar to the apparatus of Figure 1, the same elements being similarly numbered, but with the fiber 10 fixed relative to a collimating lens 32 by a movable support 34. The collimated light from the fiber 10 is focussed on the photodetector 14 by a lens 36. The fiber 10 and lens 32 when moved relative to the photodetector 14 and lens 36 adjusts the optical path length from the coupler 4 to the photodetector 14 thereby introducing a degree of tunability. Clearly alternative means for providing a variable delay may be employed which does not significantly alter the intensity of light impinging on the associated photodetector, for example switched optical delays on a lithium niobate substrate.

It may be advantageous to arrange the relative delay between arrival of the signal portions at their associated photodetectors to be greater than 1 bit so that trapezoidally shaped pulses are output on detection of square optical input pulses if this would aid discrimination.

We claim:

1. An optical detector comprising:
   two photodetectors connected in series non-opposed,
   an optical splitter for splitting a received optical signal into two portions such that each signal portion impinges on an associated one of the photodetectors, and
   a delay means located between the optical splitter and the photodetectors which provides that one signal portion is delayed relative to the other at the photodetectors.

2. An optical detector as in claim 1 in which the optical splitter comprises an optical fiber coupler having two output fibers, one being longer than the other.

3. An optical detector as in claim 1 in which the optical splitter comprises an optical beam splitter.

4. An optical detector as in claim 1 in which the delay of one signal portion relative to the other can be adjusted.

5. An optical detector as in claim 1 in which the distance from one output fiber to the associated photodetector can be adjusted and including:
   collimating means for collimating a signal portion exiting the fiber portion and
   focusing means for focusing a signal portion collimated by the collimating means onto the associated photodetector.

6. An optical receiver comprising an optical detector as in claim 1 electrically coupled to a high impedance amplifier.

7. A method of detecting an optical digital signal comprising:
   optically splitting the optical signal into two signal portions,
   delaying one signal portion relative to the other after optically splitting the optical signal, and
   causing each portion to impinge on an associated one of two photodetectors connected in series non-opposed.

8. A method as in claim 7 in which the delay is equal to the bit period of the optical signal.

9. an optical detector for detecting an input digital optical signal to produce a dicode signal, said detector comprising:
   input means for providing an input digital optical signal;
   optical splitting means for splitting the input digital optical signal from the input means into first and second portions;
   first and second photodetectors connected in series non-opposed and configured to receive said first and second signal portions respectively;
   delay means for delaying one of said signal portion relative to the other; and
   output means responsive to the photodetectors for producing a dicode signal corresponding to said input digital optical signal.

10. An optical detector as in claim 9 in which the optical splitter comprises an optical fiber coupler having two output fibers, one being larger than the other.

11. An optical detector as in claim 9 in which the optical splitter comprises an optical beam splitter.

12. An optical detector as in claim 9 in which the delay of one signal portion relative to the other can be adjusted.

13. An optical detector as in claim 9 in which the distance from one output fiber to the associated photodetector can be adjusted and including;
   collimating means for collimating a signal portion exiting the fiber portion and
   focusing means for focusing a signal portion collimating by the collimating means onto the associated photodetector.

14. An optical receiver comprising an optical detector as in claim 9 electrically coupled to a high impedance amplifier.

15. A method of detecting a digital optical signal to produce a dicode signal, comprising:
   receiving an input digital optical signal;
   optically splitting the digital optical signal into two signal portions;
   delaying one of said signal portions relative to the other;
   separately detecting the two signal portions; and
   generating a dicode signal corresponding to the digital input signal in response to said detection of the two signal portions.

16. A method according to claim 15 wherein said delaying produces a delay corresponding to one bit period of said input digital optical signal, between said signal portions.

* * * * *